R. A. RYRIE.
WELL STRAINER.
APPLICATION FILED SEPT. 21, 1914.
1,162,810.
Patented Dec. 7, 1915.
2 SHEETS—SHEET 1.
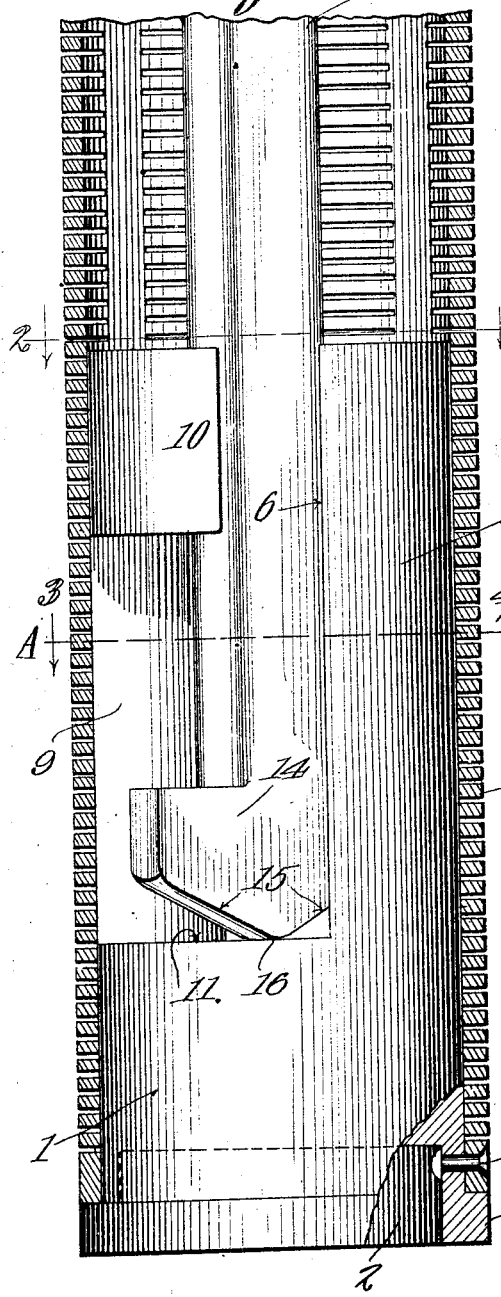
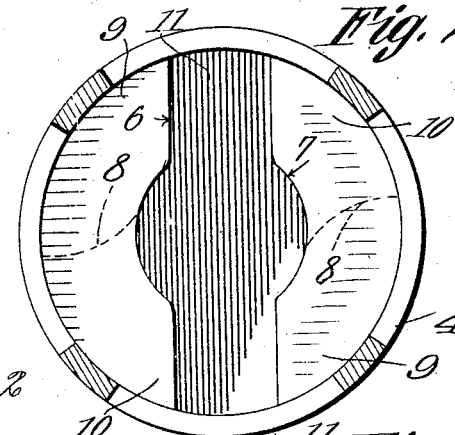
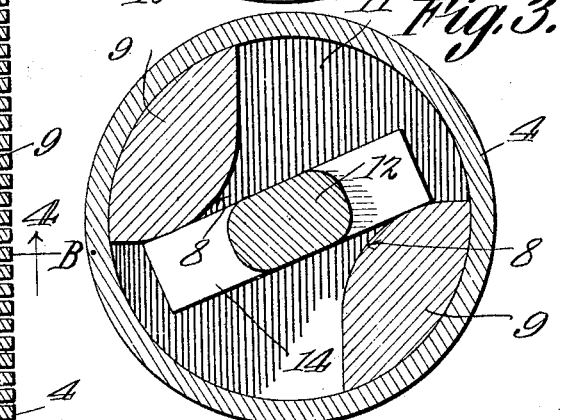
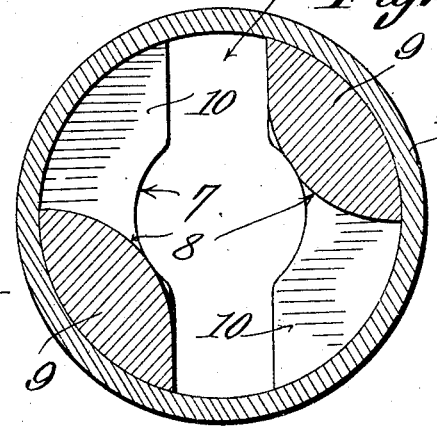
Robert A. Ryrie, Inventor,
by C. A. Snow & Co., Attorneys.
Witnesses

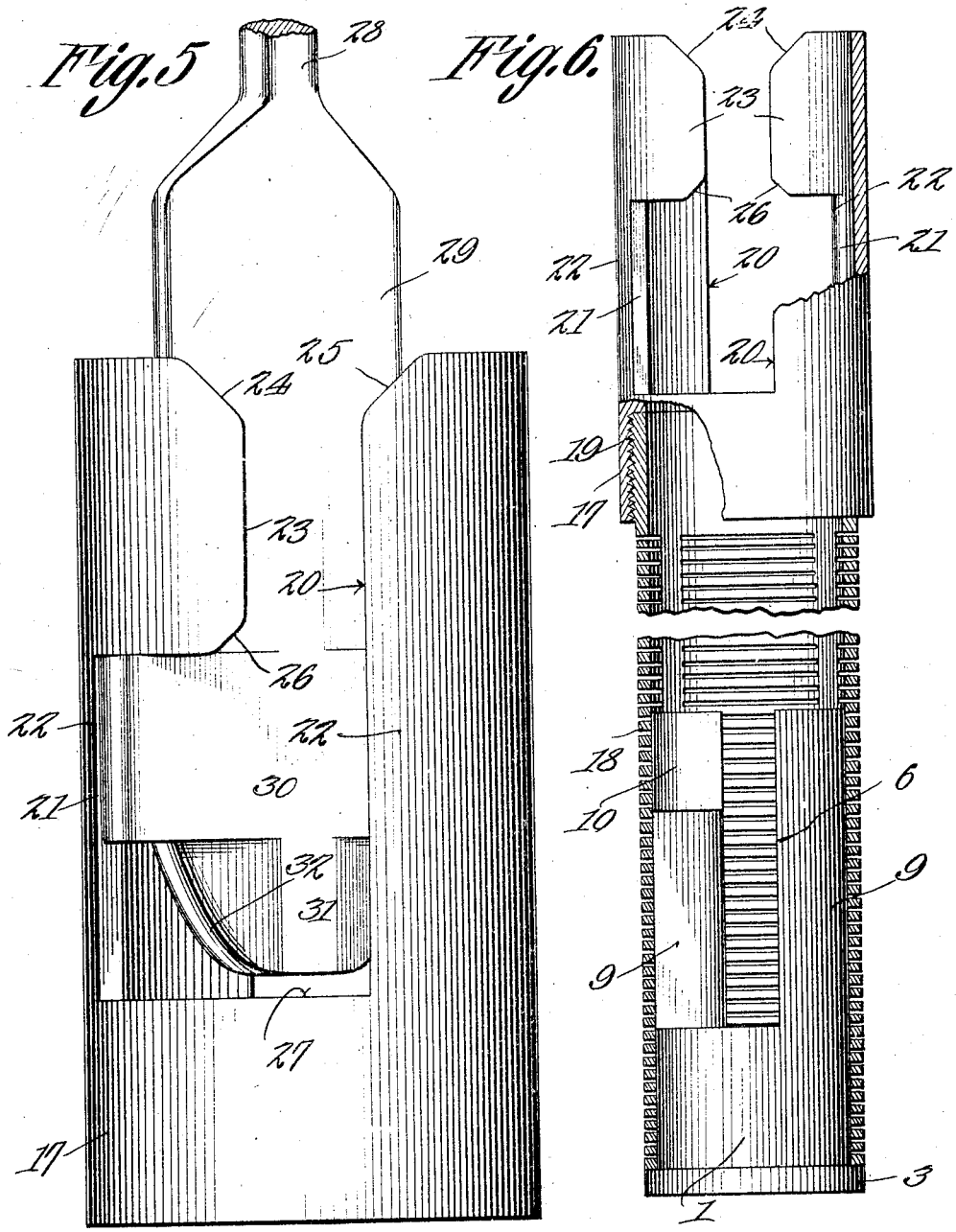

UNITED STATES PATENT OFFICE.

ROBERT A. RYRIE, OF CAMDEN, NEW JERSEY, ASSIGNOR OF ONE-HALF TO BURDETTE H. JOHNSON, OF DELANCO, NEW JERSEY.

WELL-STRAINER.

1,162,810.  Specification of Letters Patent.  Patented Dec. 7, 1915.

Application filed September 21, 1914. Serial No. 862,837.

*To all whom it may concern:*

Be it known that I, ROBERT A. RYRIE, a citizen of the United States, residing at Camden, in the county of Camden and State of New Jersey, have invented a new and useful Well-Strainer, of which the following is a specification.

The device forming the subject matter of this application is a means whereby a strainer may be removed from the tubing of a well.

One object of the present invention is to provide a device of this type in which the fishing tool is permitted to have a longitudinal movement, thereby to jar the strainer and loosen the same, the construction being such that this jarring movement may take place without danger of loosening or detaching the fishing tool from the strainer support.

Another object of the invention is to provide a novel means whereby during the lowering of the tool and a rotation thereof, the tool may be interlocked with the strainer support.

A further object of the invention is to provide novel means for centering the fishing tool with respect to the strainer support.

It is within the scope of the invention to improve generally and to enhance the utility of devices of that type to which the present invention appertains.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings:—Figure 1 shows in longitudinal section, a portion of a strainer wherewith one form of strainer support has been assembled, the strainer support for the most part appearing in elevation, parts thereof being broken away, and the fishing tool being shown in place; Fig. 2 is a cross section on the line 2—2 of Fig. 1; Fig. 3 is a cross section on the line A—B of Fig. 1, looking downwardly in the direction of the arrow 3; Fig. 4 is a transverse section on the line A—B of Fig. 1, looking upwardly in the direction of the arrow 4; Fig. 5 is a side elevation showing a modified form of strainer support; and Fig. 6 is a sectional elevation showing both of the supports hereinbefore alluded to, assembled with the strainer.

The strainer support delineated in Figs. 1, 2, 3 and 4 is in the form of a plug which is inserted into the lower end of the strainer. The strainer support under consideration includes a solid body portion 1, provided in its lower end with a recess 2 and having, at its lower end, an outwardly projecting lateral flange 3. The strainer 4, which is ordinarily of tubular form, embraces the body portion of the strainer support or plug closely, and rests at its lower end upon the flange 3, as Fig. 1 will make evident. Securing elements 5 of any desired sort and of any preferred number pass through the lower portion of the strainer 4 and through the lower end of the body 1 of the strainer, the inner ends of the securing elements 5 being housed in the recess 2. Owing to the construction last above described, it will be obvious that the mounting and removal of the securing elements 5 are facilitated. As will be understood best from Fig. 2, the body portion 1 of the support is longitudinally slotted as shown at 6. In its upper end, the body portion of the support is provided with a circular centering bore 7, opening into the slot 6 intermediate the lateral extremities of the slot. The function of the centering bore 7 will be pointed out hereinafter. As shown at 8, the body of the support is cut away laterally, in opposite directions and upon opposed sides, to define upright standards 9 and to define oppositely projecting transverse arms 10 adjacent the upper ends of the standards 9. The upper face of the solid lower end of the body of the strainer forms a table 11 which coöperates with the arms 10 in a manner which will be set forth hereinafter. A fishing tool is provided, the same comprising a shank 12 and a transverse head 14. The lower edges of the head 14 converge downwardly as shown at 15, to define a centering boss 16. As will be understood by those skilled in the art, the strainer 4, commonly, is located within the well tubing (not shown).

In operation, the fishing tool is lowered and the centering boss 16 comes into engagement with centering bore 7. Then the fishing tool is rotated until the head 14 thereof is alined with the slot 6, whereupon the tool is lowered until the transverse head 14 lies below the arms 10. Then the fishing tool is rotated axially, until the ends of the head 14 lie beneath the arms 10. If the fishing tool now be drawn upwardly, it is obvious that the upper edges of the head 14 on the fishing tool will come into contact with the lower edges of the arms 10 on the strainer support, under which conditions, the strainer support and the strainer may be lifted out of the well tubing. It is to be observed that the distance between the lower edges of the arms 10 and the table 11 is sufficient so that the fishing tool may be given a reciprocating motion, after the same has been turned axially to dispose the ends of the head 14 beneath the arms 10. When a reciprocating motion is imparted to the fishing tool, the boss 16 on the tool, as the latter moves downwardly, will come into contact with the table 11, and the upper edge of the head 14, as the tool moves upwardly, will come into contact with the lower edges of the arms 10, it being obvious that by this operation, a jar will be imparted to the strainer support and the strainer, thereby loosening these elements from the well tubing. It is to be observed, further, that this reciprocating movement of the fishing tool takes place without in anywise endangering the interlocking engagement between the fishing tool and the strainer support.

Passing to that form of the invention which is delineated in Figs. 5 and 6, the body 17 of the strainer support is of tubular form and is threaded as shown at 19, to engage the upper end of the strainer 18, the support under consideration being in the form of a casing. The tubular body 17 of the strainer support is provided with a longitudinal slot 20 and is cut away laterally and in opposite directions upon opposed sides as shown at 21, to define upright standards 22 and oppositely projecting transverse arms 23. Each arm 23 adjacent its extremity and upon its upper edge is beveled as shown at 24 and the opposed portion of the standard 22 is beveled as shown at 25. The lower edge of each arm 23 may be beveled at its end as shown at 26. The fishing tool embodies a shank 28, a blade 29, and a transverse head 30 projecting beyond opposite edges of the blade 29, the head 30 being equipped at its lower end with a centering boss or foot 31, the edges of which converge and extend downwardly as shown at 32. The casing 17 is assembled with the upper end of the strainer 18 as shown in Fig. 6. The fishing tool is lowered into the well and as the tool is lowered, the lower edges of the transverse head 30 engage the beveled edges 24 and 25 of the casing, and thus the fishing tool is centered. The tool is lowered through the slot 20 and then is rotated until the ends of the head 30 lie beneath the arms 23. The fishing tool may be reciprocated, as before, to produce a jar, the necessary abutments being provided by the lower edges of the arms 23 and transverse shoulders 27 formed on the body portion of the strainer, between the standards 22. As the fishing tool moves downwardly, the foot or boss 31 coöperates with the lower portion of the casing to center the tool and it is to be observed that when the lower edge of the transverse head 30 first comes into contact with the upper end of the casing 17, the boss or foot 31 enters within the casing and serves to center the tool, before the tool is rotated to bring the lower edges of the head 30 into coöperation with the beveled portions 24 and 25 of the casing. When the tool is being removed from the casing, the beveled edges 26 facilitate such an operation, as will be obvious from Fig. 5. As clearly shown in Fig. 6, the upper end of the strainer may be provided with the structure shown in Fig. 5, the lower end of the strainer being equipped with the device depicted in Fig. 1.

Especial attention is directed to the fact that in both forms of the invention, a jar may be imparted to the strainer support, for the purpose of loosening the same, such jar being imparted without endangering the interlocked engagement between the fishing tool and the support.

Having thus described the invention, what is claimed is:—

1. In a device of the class described, a strainer support having vertically spaced parts; and a fishing tool mounted to reciprocate independently of the support and including a transverse head, the tool being rotatable to dispose the head between said parts of the support, the height of the head being less than the distance between the said parts of the support, whereby the head may reciprocate therebetween and exert a jarring action thereon, after the tool has been rotated.

2. In a device of the class described, a strainer support including a body provided with a longitudinal slot, the body being cut away laterally and in opposite directions upon opposite sides to define a table, upright standards, and oppositely projecting transverse arms adjacent the upper ends of the standards and spaced vertically from the table; and a fishing tool comprising a shank and a transverse head, the head being insertible into the support through the slot, and the tool being rotatable to dispose the ends of the head between the arms and the table, the tool being mounted to reciprocate in the support and the head being of less height than the distance between the table and the arms, whereby, when the tool is reciprocated, after it has been rotated, the head will contact with the arms and the table and effect a jarring of the support.

In testimony that I claim the foregoing as my own, I have hereto affixed my signature in the presence of two witnesses.

ROBERT A. RYRIE.

Witnesses:
HENRY H. HAYES,
S. M. PHILLIPS.